United States Patent
Lee

(10) Patent No.: US 11,085,351 B2
(45) Date of Patent: Aug. 10, 2021

(54) SYSTEM AND METHOD FOR DETERMINING ERROR IN VEHICLE CATALYTIC CONVERTER

(71) Applicants: Hyundai Motor Company, Seoul (KR); Kia Motors Corporation, Seoul (KR)

(72) Inventor: Sung Ha Lee, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 37 days.

(21) Appl. No.: 16/519,819

(22) Filed: Jul. 23, 2019

(65) Prior Publication Data

US 2020/0300149 A1   Sep. 24, 2020

(30) Foreign Application Priority Data

Mar. 19, 2019  (KR) .................. 10-2019-0031179

(51) Int. Cl.
*F01N 11/00* (2006.01)
*F01N 13/00* (2010.01)

(52) U.S. Cl.
CPC .......... *F01N 11/007* (2013.01); *F01N 13/008* (2013.01); *F01N 2560/025* (2013.01); *F01N 2900/08* (2013.01)

(58) Field of Classification Search
CPC .. F01N 2900/08; F01N 11/007; F01N 13/008; F01N 2560/025; F02D 41/1454; F02D 41/1495
USPC ......................................................... 60/276
See application file for complete search history.

(56) References Cited

U.S. PATENT DOCUMENTS

| | | | | |
|---|---|---|---|---|
| 5,341,642 A * | 8/1994 | Kurihara | ............... | F01N 11/007 60/276 |
| 5,379,587 A * | 1/1995 | Toyoda | ................ | F01N 11/007 60/276 |
| 5,396,765 A * | 3/1995 | Maruyama | .......... | F02D 41/1495 60/276 |
| 5,396,766 A * | 3/1995 | Sato | ...................... | F01N 11/007 60/276 |
| 5,636,514 A * | 6/1997 | Seki | ...................... | F01N 11/007 60/277 |
| 5,678,402 A * | 10/1997 | Kitagawa | .............. | F01N 11/007 60/276 |
| 5,758,491 A * | 6/1998 | Agustin | ................ | F01N 11/007 60/276 |
| 5,924,281 A * | 7/1999 | Yasui | .................. | F02D 41/1441 60/276 |
| 6,176,080 B1 * | 1/2001 | Izumiura | ............. | F02D 41/1495 60/276 |
| 8,516,796 B2 * | 8/2013 | Wald | ...................... | F01N 11/00 60/277 |

(Continued)

FOREIGN PATENT DOCUMENTS

KR   20030096946 A   12/2003

*Primary Examiner* — Thai Ba Trieu
(74) *Attorney, Agent, or Firm* — Mintz Levin Cohn Ferris Glovsky and Popeo, P.C.; Peter F. Corless

(57) ABSTRACT

A system and method for determining an error in a vehicle catalytic converter prevent an incorrect determination and improve reliability of the determination. The method includes determining whether the error occurs in the catalytic converter in consideration of both fuel injection state and fuel injection cut-off state.

6 Claims, 5 Drawing Sheets

(56) References Cited

U.S. PATENT DOCUMENTS

| | | | |
|---|---|---|---|
| 8,522,531 B2* | 9/2013 | Matsumoto | F02D 41/1454 60/277 |
| 9,359,967 B2* | 6/2016 | Santillo | F01N 11/007 |
| 9,382,865 B2* | 7/2016 | Genslak | F02D 41/1454 |
| 9,599,006 B2* | 3/2017 | Genslak | F01N 11/007 |
| 9,638,125 B2* | 5/2017 | Tanaka | F01N 11/007 |
| 9,650,981 B1* | 5/2017 | Large | F01N 11/007 |
| 9,890,724 B2* | 2/2018 | Tanaka | F02D 41/1456 |
| 2010/0212414 A1* | 8/2010 | Nakamura | F02D 41/1495 73/114.73 |
| 2017/0138245 A1* | 5/2017 | Hagiwara | F01N 11/007 |

* cited by examiner

SYSTEM AND METHOD FOR DETERMINING ERROR IN VEHICLE CATALYTIC CONVERTER

CROSS REFERENCE TO RELATED APPLICATION

The present application claims priority to Korean Patent Application No. 10-2019-0031179, filed on Mar. 19, 2019, the entire contents of which is incorporated herein for all purposes by this reference.

BACKGROUND

1. Technical Field

The present disclosure relates to a system and method for determining an error in a vehicle catalytic converter, and more particularly, to a system and method which prevent an incorrect determination when determining whether an error occurs in the catalytic converter.

2. Description of the Related Art

Today's internal combustion engine such as a gasoline engine burns fuel in a cylinder and uses a heat energy generated therefrom as a power source. Therefore, exhaust gas contains harmful components such as nitrogen oxides generated by combustion and carbon monoxide, hydrocarbons or the like generated by incomplete combustion. To reduce such harmful components in the exhaust gas, a vehicle includes a catalytic converter. The catalytic converter is configured to oxidize the harmful components in the exhaust gas through a discharge of oxygen adsorbed therein to reduce the exhaust gas.

Therefore, in a method for determining whether an error occurs in the catalytic converter, more fuel is injected to make the exhaust gas richer than a stoichiometric air-fuel ratio when injecting the fuel. Thereafter, whether the error occurs in the catalytic converter is determined based on a difference between time when oxygen sensors disposed before and behind the catalytic converter each displays a rich exhaust gas signal. However, when a driver presses and releases an accelerator pedal for a moment, a fuel injection amount is minimal and a temperature of the exhaust gas thus fails to increase sufficiently. Accordingly, the catalytic converter fails to reach an activation temperature. In addition, the fuel is unburned and directly discharged without being oxidized in the catalytic converter. Therefore, the oxygen sensors disposed before and behind the catalytic converter display the rich exhaust gas signal at almost the same time. In particular, even though the catalytic converter is operated normally, it may be determined incorrectly that the error occurs in the catalytic converter.

The contents described as the related art are provided merely to assist in understanding the background of the present disclosure and should not be considered as corresponding to the related art known to those having ordinary skill in the art.

SUMMARY

An object of the present disclosure is to provide a system and method for determining an error in a vehicle catalytic converter, which prevent an incorrect determination of the error in the catalytic converter, by determining whether the error occurs in the catalytic converter in consideration of both fuel injection state and fuel injection cut-off state.

According to an exemplary embodiment of the present disclosure, a system for determining an error in a vehicle catalytic converter may include: a first oxygen sensor disposed before an inlet of a catalytic converter and configured to receive (e.g., detect) information regarding concentration of oxygen in exhaust gas; a second oxygen sensor disposed behind an outlet of the catalytic converter and configured to receive (e.g., detect) the information regarding concentration of oxygen in exhaust gas; and a controller configured to receive the information regarding concentration of oxygen in exhaust gas from the first and second oxygen sensors to calculate air-fuel ratios and detect a time when each of the air-fuel ratios reaches a lean reference value or a rich reference value to determine the error in the catalytic converter.

In a fuel injection state, the controller may be configured to determine that the error occurs in the catalytic converter when a value less than a preset first time reference value is obtained from a difference between time when the air-fuel ratio, which is calculated based on the information of the first oxygen sensor, reaches the rich reference value and time when the air-fuel ratio, which is calculated based on the information of the second oxygen sensor, reaches the rich reference value. In a fuel injection cut-off state, the controller may be configured to suspend determining that the error occurs in the catalytic converter when a preset second time reference value or greater is obtained from a difference between time when the air-fuel ratio, which is calculated based on the information of the first oxygen sensor, reaches the lean reference value and time when the air-fuel ratio, which is calculated based on the information of the second oxygen sensor, reaches the lean reference value.

The controller may finally be configured to determine that the error occurs in the catalytic converter when satisfying both conditions including: a first condition in the fuel injection state, where a value less than the preset first time reference value is obtained from the difference between time when the air-fuel ratio, which is calculated based on the information of the first oxygen sensor, reaches the rich reference value and time when the air-fuel ratio, which is calculated based on the information of the second oxygen sensor, reaches the rich reference value; and a second condition in the fuel injection cut-off state, where a value less than the preset second time reference value is obtained from a difference between time when the air-fuel ratio calculated based on the information of the first oxygen sensor reaches the lean reference value and time when the air-fuel ratio calculated based on the information of the second oxygen sensor reaches the lean reference value.

The system for determining the error in a vehicle catalytic converter may further include a fuel regulator configured to adjust a fuel injection amount based on a depressed amount of an accelerator pedal. The controller may be configured to receive information regarding the fuel injection state based on the depressed amount of the accelerator pedal. The controller may then be configured to transmit a warning message to a driver in response to determining that the error occurs in the catalytic converter.

According to another exemplary embodiment of the present disclosure, a method for determining an error in a vehicle catalytic converter may include: detecting the air-fuel ratio measured before an inlet of a catalytic converter and the air-fuel ratio measured behind an outlet of the catalytic converter; detecting whether the catalytic converter is in a fuel injection state or in a fuel injection cut-off state; and determining that the error occurs in the catalytic converter in the fuel injection state, when a value less than a preset first time reference value is obtained from a difference between time when the air-fuel ratio measured before the inlet of the catalytic converter reaches a rich reference value and time when the air-fuel ratio measured behind the outlet of the catalytic converter reaches the rich reference value, and suspending a determination of the error in the catalytic converter in the fuel injection cut-off state, when a preset second time reference value or greater is obtained in advance from a difference between time when the air-fuel ratio measured before the inlet of the catalytic converter reaches a lean reference value and time when the air-fuel ratio measured behind the outlet of the catalytic converter reaches the lean reference value.

The error determining may finally include determining that the error occurs in the catalytic converter when satisfying both conditions including: a first condition in the fuel injection state, where a value less than the preset first reference value is obtained from the difference between time when the air-fuel ratio measured before the inlet of the catalytic converter reaches the rich reference value and time when the air-fuel ratio measured behind the outlet of the catalytic converter reaches the rich reference value; and a second condition in the fuel injection cut-off state, where a value less than the preset second reference value is obtained from the difference between time when the air-fuel ratio measured before the inlet of the catalytic converter reaches the lean reference value and time when the air-fuel ratio measured behind the outlet of the catalytic converter reaches the lean reference value.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinafter, a system and method for determining an error in a vehicle catalytic converter according to exemplary embodiments of the present disclosure are described with reference to the accompanying drawings.

Figure 1:
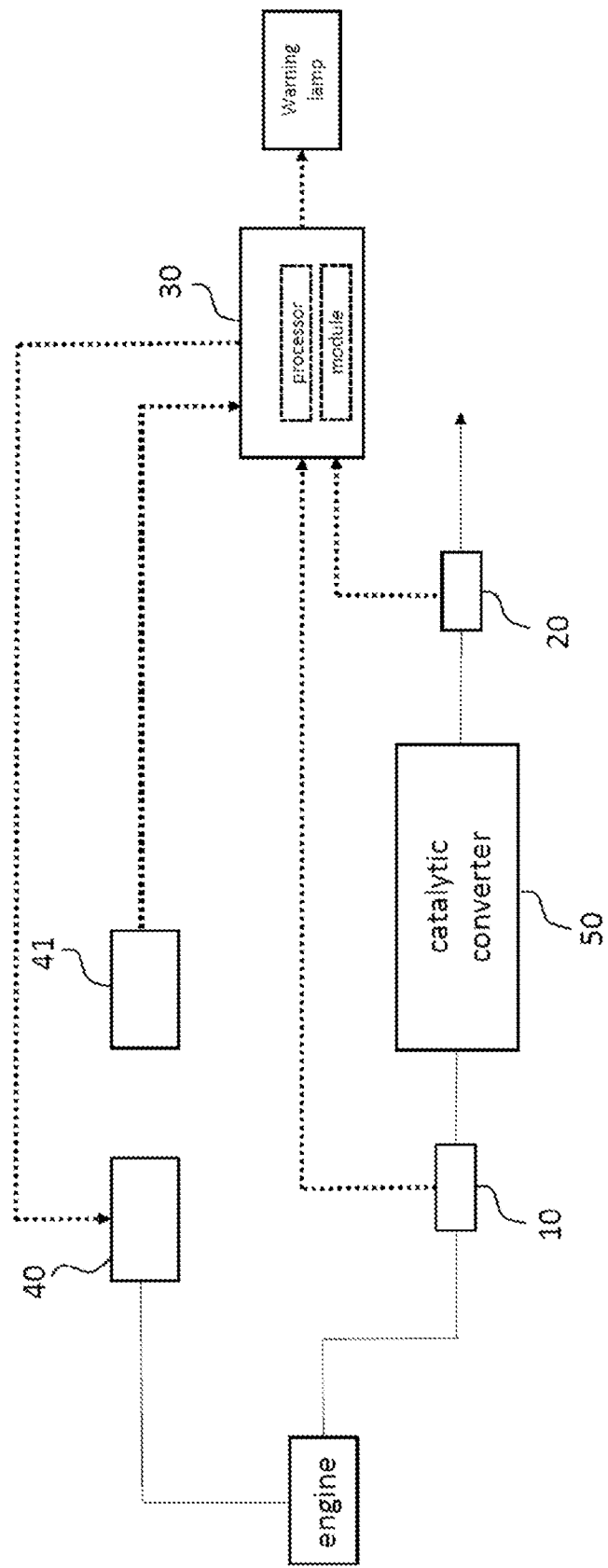
FIG. 1 is a configuration diagram illustrating a system for determining an error in a vehicle catalytic converter according to an exemplary embodiment of the present disclosure.
Figure 2:
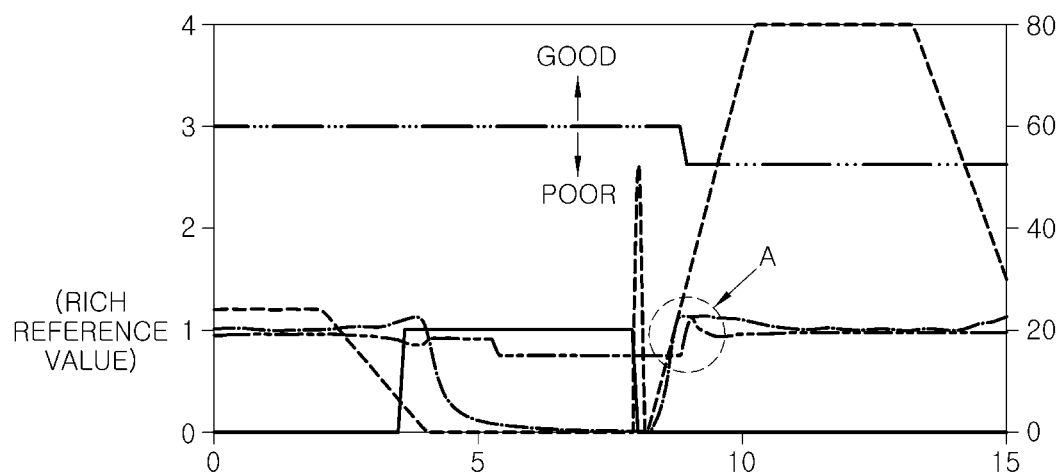
FIGS. 2 and 3 are graphs illustrating a system for determining an error in a vehicle catalytic converter according to the related art and according to an exemplary embodiment of the present disclosure.
Figure 3:
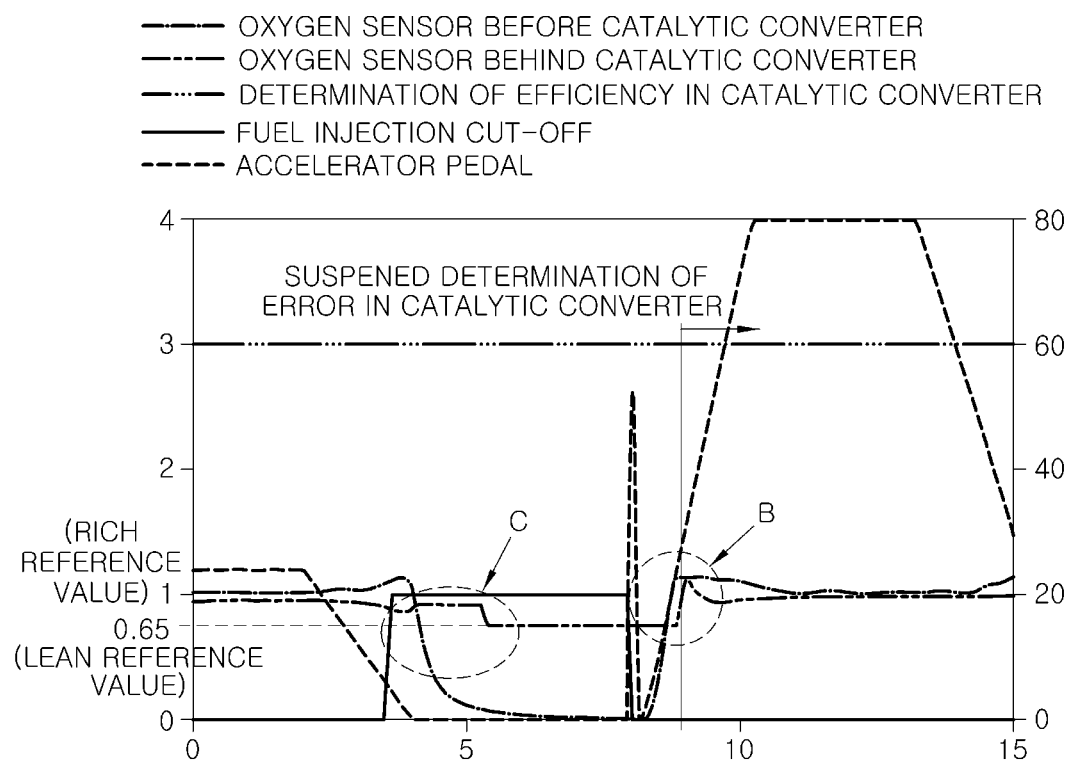
Figure 4:
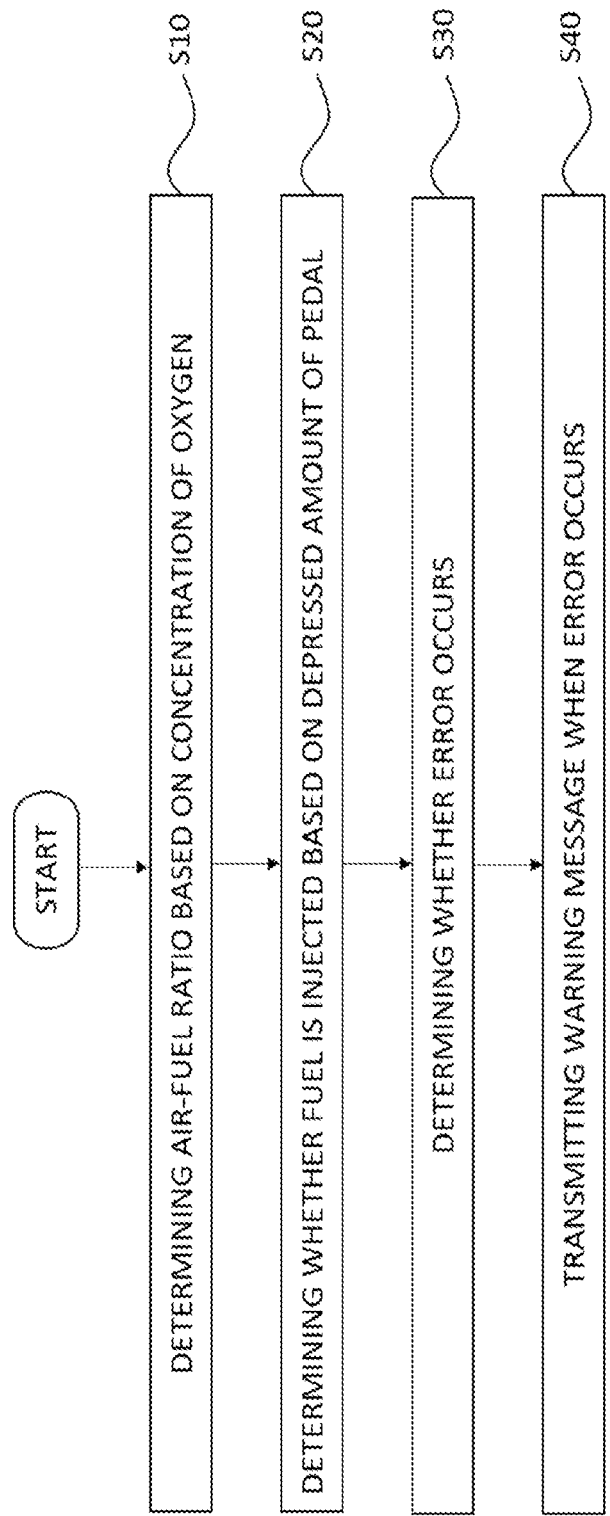
FIGS. 4 and 5 are flowcharts illustrating a method for determining an error in a vehicle catalytic converter according to an exemplary embodiment of the present disclosure.
Figure 5:
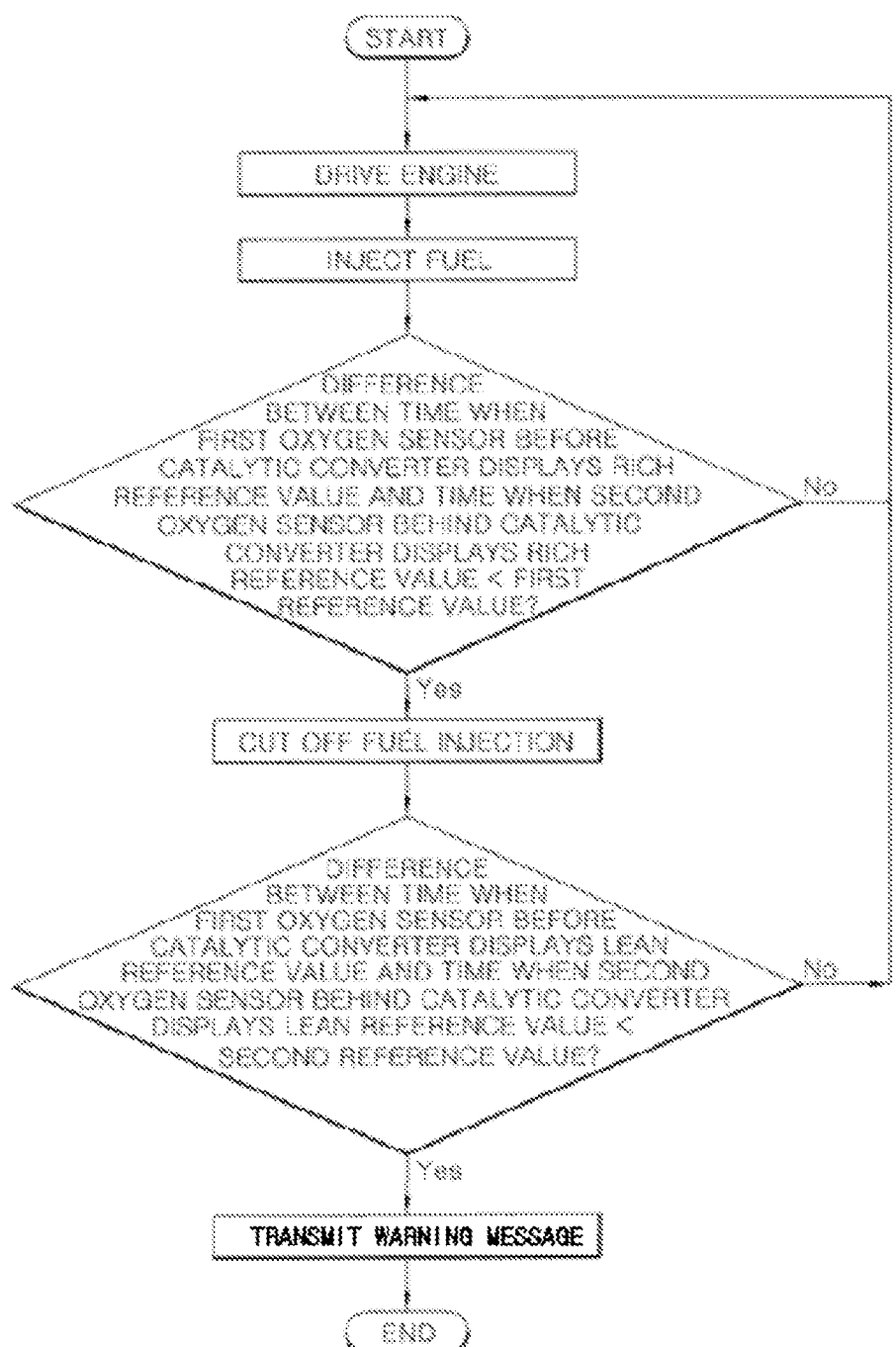

FIG. 1 is a configuration diagram illustrating a system for determining an error in a vehicle catalytic converter according to an exemplary embodiment of the present disclosure; FIGS. 2 and 3 are graphs illustrating a system for determining an error in a vehicle catalytic converter according to an exemplary embodiment of the present disclosure; and FIGS. 4 and 5 are flowcharts illustrating a method for determining an error in a vehicle catalytic converter according to an exemplary embodiment of the present disclosure.

As illustrated in FIG. 1, a system for determining an error in a vehicle catalytic converter according to an exemplary embodiment of the present disclosure may include: a first oxygen sensor 10 disposed before an inlet of a catalytic converter 50 and configured to receive information regarding concentration of oxygen in exhaust gas; a second oxygen sensor 20 disposed behind an outlet of the catalytic converter 50 and configured to receive the information regarding concentration of oxygen in exhaust gas; and a controller 30 configured to receive the information regarding concentration of oxygen in exhaust gas from the first and second oxygen sensors 10 and 20 to calculate air-fuel ratios and detect a time when each of the air-fuel ratios reaches a lean reference value or a rich reference value to determine the error in the catalytic converter 50.

In a fuel injection state, the controller 30 may be configured to determine that the error occurs in the catalytic converter 50 when a value less than a preset first time reference value is obtained from a difference between time when the first oxygen sensor 10 has the rich reference value and time when the second oxygen sensor 20 has the rich reference value. In a fuel injection cut-off state, the controller 30 may be configured to suspend determining that the error occurs in the catalytic converter 50 when a preset second time reference value or greater is obtained from a difference between time when the first oxygen sensor 10 has the lean reference value and time when the second oxygen sensor 20 has the lean reference value.

Particularly, the first oxygen sensor 10 and the second oxygen sensor 20 may each be disposed before (e.g., in front of) and behind the catalytic converter 50, and the first oxygen sensor 10 and the second oxygen sensor 20 may each be configured to receive the information regarding concentration of oxygen in exhaust gas. The first oxygen sensor 10 and the second oxygen sensor 20 may be oxygen sensors configured to obtain or sense concentration of oxygen in exhaust gas to determine the lean or rich exhaust gas or air-fuel ratio sensors configured to determine the air-fuel ratio (lambda value) of the exhaust gas.

Meanwhile, the controller 30 may be configured to receive the information regarding concentration of oxygen in exhaust gas from the first oxygen sensor 10 and the second oxygen sensor 20 to calculate the air-fuel ratios and detect a time when each of the air-fuel ratios reaches a preset lean reference value or a preset rich reference value. In other words, in the fuel injection state, the controller 30 may be configured to determine that the error occurs in the catalytic converter 50 when a value less than the preset first time reference value is obtained from a difference between time when the air-fuel ratio, which is calculated based on the information regarding concentration of oxygen in exhaust gas measured by the first oxygen sensor 10, reaches the rich reference value and a time when the air-fuel ratio, which is calculated based on the information regarding concentration of oxygen in exhaust gas measured by the second oxygen sensor 20, reaches the rich reference value. For example, the reach reference value may be preset as the air-fuel ratio of 1, and the lean reference value may be preset as the air-fuel ratio of 0.65, but not limited hereto.

The fuel injection state may depend on a fuel injection amount input through a fuel regulator 40 configured to adjust the fuel injection amount based on a depressed or engaged amount of an accelerator pedal 41. Therefore, the controller 30 may be configured to receive information regarding the fuel injection state based on the depressed or engaged amount of the accelerator pedal 41 to determine whether the error occurs in the catalytic converter 50.

In other words, when a driver engages (e.g., exerts force onto) the accelerator pedal to inject the fuel, the controller 30 may be configured to determine that the catalytic converter 50 is operated normally when the preset first time reference value or greater is obtained from the difference between a time when the air-fuel ratio calculated based on the information of the first oxygen sensor 10 reaches the rich reference value and a time when the air-fuel ratio calculated based on the information of the second oxygen sensor 20 reaches the rich reference value.

However, the controller 30 may be configured to determine that the error occurs in the catalytic converter 50 when a value less than the preset first time reference value is obtained from the difference between a time when the air-fuel ratio calculated based on the information of the first oxygen sensor 10 reaches the rich reference value and a time when the air-fuel ratio calculated based on the information of the second oxygen sensor 20 reaches the rich reference value. Particularly, the first reference value may be set based on a time measured when the air-fuel ratio calculated based on the information of the first oxygen sensor 10 and the air-fuel ratio calculated based on the information of the second oxygen sensor 20 each becomes a stoichiometric air-fuel ratio when the catalytic converter 50 is operated normally and an oxidation-reduction reaction is performed normally. Thus, the preset first time reference value may depend on the catalytic converter 50 and an engine operating condition.

When the driver presses or engages and releases the accelerator pedal 41 for a moment (e.g., suddenly), the fuel injection amount is insufficient and thus a temperature of the exhaust gas fails to increase sufficiently even though the driver engages the accelerator pedal 41 to inject the fuel. Accordingly, as the catalytic converter 50 fails to reach an activation temperature, the unburned fuel may be discharged without being oxidized in the catalytic converter 50. Thus, the air-fuel ratio calculated based on the information of the first oxygen sensor 10 and the air-fuel ratio calculated based on the information of the second oxygen sensor 20 may be measured or determined to be in a rich exhaust gas state. In other words, when the driver presses and releases the accelerator pedal suddenly, the fuel injection amount is insufficient and thus the error may be incorrectly detected in the catalytic converter 50 even though the catalytic converter 50 is operated normally.

Therefore, in the present disclosure, whether the error occurs in the catalytic converter may be determined more accurately based on the fuel injection cut-off state as well as the fuel injection state. In other words, in the present disclosure, when the driver in a normal driving condition releases a pressing force from the accelerator pedal 41 and thus a fuel injection is cut off, whether a time when each of the air-fuel ratios calculated based on the information input through the first and second oxygen sensors 10 and 20 reaches the lean reference value has a value less than the preset second time reference value or the preset second time reference value or greater may be determined. In other words, when the accelerator pedal 41 is pressed and released suddenly, the fuel injection amount required for the catalytic converter 50 to reach the activation temperature is not ensured.

Therefore, whether the error occurs in the catalytic converter 50 may be determined based on the lean reference value under a condition relatively less than a normal condition for determining whether the error occurs in the catalytic converter 50. In particular, the second reference value may be set based on a time measured when the air-fuel ratio calculated based on the information of the first oxygen sensor 10 and the air-fuel ratio calculated based on the information of the second oxygen sensor 20 each becomes a stoichiometric air-fuel ratio when the catalytic converter 50 is operated normally and an oxidation-reduction reaction is performed normally. Thus, the preset second time reference value may depend on the catalytic converter 50 and an engine operating condition.

Therefore, when the driver releases the pressing force engaging the accelerator pedal 41 and thus the fuel injection is cut off, the controller 30 may be configured to suspend determining that the error occurs in the catalytic converter 50 when the preset second reference value or greater is obtained from the difference between a time when the air-fuel ratio calculated based on the information of the first oxygen sensor 10 reaches the lean reference value and a time when the air-fuel ratio calculated based on the information of the second oxygen sensor 20 reaches the lean reference value. Accordingly, the controller 30 may prevent an incorrect determination of the error in the vehicle catalytic converter 50. Whether the catalytic converter 50 is operated normally may be determined more accurately by determining the error in the catalytic converter 50 in consideration of the fuel injection cut-off state.

Therefore, the controller 30 may be configured to finally determine that the error occurs in the catalytic converter 50 when satisfying two conditions including: a first condition in the fuel injection state, where a value less than the preset first reference value is obtained from the difference between a time when the air-fuel ratio calculated based on the information of the first oxygen sensor 10 reaches the rich reference value and a time when the air-fuel ratio calculated based on the information of the second oxygen sensor 20 reaches the rich reference value; and a second condition in the fuel injection cut-off state, where a value less than the preset second reference value is obtained from a difference between a time when the air-fuel ratio calculated based on the information of the first oxygen sensor 10 reaches the lean reference value and a time when the air-fuel ratio calculated based on the information of the second oxygen sensor 20 reaches the lean reference value.

As described above, in the present disclosure, whether the error occurs in the catalytic converter 50 may be determined in consideration of both the fuel injection state and fuel injection cut-off state. As the fuel injection state may depend on a depression of the accelerator pedal 41, a condition suitable for each different state may be applied to more accurately determine whether the error occurs in the catalytic converter 50. In this manner, it may be possible to minimize a possibility of incorrectly determining that the error occurs in the catalytic converter 50.

For example, as illustrated in FIG. 2, in the related art, when the driver presses and releases the accelerator pedal suddenly, the fuel injection amount is insufficient and thus the catalytic converter 50 fails to reach the activation temperature even though the catalytic converter 50 is operated normally. As a result, the catalytic converter 50 has a reduced oxygen adsorption capacity. As illustrated in portion A in FIG. 2, a value less than the first reference value is obtained for a moment from the difference between a time when the air-fuel ratio calculated based on the information of the first oxygen sensor 10 reaches the rich reference value and a time when the air-fuel ratio based on the information of the second oxygen sensor 20 reaches the rich reference value. The error may thus be incorrectly determined to occur in the catalytic converter 50.

FIG. 3 according to the present disclosure illustrates that the driver presses and releases the accelerator pedal suddenly, and thus the fuel injection is cut off; and portion B in FIG. 3 shows each of the air-fuel ratios reaches the rich reference value for a moment. However, as shown in portion C in FIG. 3, the preset second reference value or greater is obtained in advance from the difference between a time when the air-fuel ratio calculated based on the information of the first oxygen sensor 10 reaches the lean reference value and a time when the air-fuel ratio calculated based on the information of the second oxygen sensor 20 reaches the lean reference value. In particular, the error is not determined to have occurred in the catalytic converter 50, and a determination of the error in the catalytic converter may be suspended.

Therefore, in the fuel injection state and the fuel injection cut-off state, an incorrect determination of the error in the catalytic converter 50 may be prevented and an accurate determination may be achieved by: comparing and determining a time when each of the air-fuel ratios reaches the lean reference value or the rich reference value; suspending the determination of the error in the catalytic converter when any one of the conditions is not satisfied; and finally determining that the error occurs in the catalytic converter 50 when all the conditions are satisfied. Meanwhile, the controller 30 may be configured to transmit a warning message to the driver to provide a notification regarding the error in the catalytic converter 50 in response to detecting that the error occurs in the catalytic converter 50. Accordingly, when the error occurs in the catalytic converter 50, a warning lamp may be turned on in a vehicle display or cluster.

As illustrated in FIGS. 4 and 5, a method for determining an error in a vehicle catalytic converter according to an exemplary embodiment of the present disclosure may include: detecting the air-fuel ratio measured before (e.g., in front of) an inlet of a catalytic converter 50 and the air-fuel ratio measured behind an outlet of the catalytic converter 50 so as to determine the air-fuel ratio based on a concentration of oxygen in exhaust gas (S10); detecting whether fuel is injected based on a depressed amount of the accelerator pedal 41 or the fuel injection is cut off (S20); and determining that the error occurs in the catalytic converter 50 in a fuel injection state, when a value less than a preset first time reference value is obtained from a difference between a time when the air-fuel ratio measured before the inlet of the catalytic converter 50 reaches a rich reference value and a time when the air-fuel ratio measured behind the outlet of the catalytic converter 50 reaches the rich reference value (S30), transmitting a warning message to the driver to provide a notification regarding the error in the catalytic converter 50 in response to detecting that the error occurs in the catalytic converter 50 (S40), and suspending a determination of the error in the catalytic converter 50 in a fuel injection cut-off state, when a preset second time reference value or more is obtained in advance from a difference between a time when the air-fuel ratio measured before the inlet of the catalytic converter 50 reaches a lean reference value and a time when the air-fuel ratio measured behind the outlet of the catalytic converter 50 reaches the lean reference value.

In other words, when the driver presses the accelerator pedal to inject the fuel, the catalytic converter 50 may be determined to operate normally when the preset first reference value or greater is obtained from the difference between a time when the air-fuel ratio measured before the inlet of the catalytic converter 50 reaches the rich reference value and a time when the air-fuel ratio measured behind the outlet of the catalytic converter 50 reaches the rich reference value. However, the error in the catalytic converter 50 may be detected when a value less than the preset first reference value is obtained from the difference between a time when the air-fuel ratio measured before the inlet of the catalytic converter 50 reaches the rich reference value and a time when the air-fuel ratio measured behind the outlet of the catalytic converter 50 reaches the rich reference value.

When the accelerator pedal 41 is suddenly pressed and released, the fuel injection amount required for the catalytic converter 50 to reach the activation temperature is not ensured. Therefore, whether the error occurs in the catalytic converter 50 may be determined based on the lean reference value under a condition lower than a normal condition for determining whether the error occurs in the catalytic converter 50.

Therefore, when the driver releases the pressing force depressing the accelerator pedal 41 and thus the fuel injection is cut off, an incorrect determination of the error in the catalytic converter may be prevented by suspending a determination that the error occurs in the catalytic converter when the preset second time reference value or more is obtained from the difference between a time when the air-fuel ratio measured before the inlet of the catalytic converter 50 reaches the lean reference value and a time when the air-fuel ratio measured behind the outlet of the catalytic converter 50 reaches the lean reference value. Accordingly, whether the catalytic converter is operated normally may be determined more accurately by determining the error in the catalytic converter in consideration of the fuel injection cut-off state.

Meanwhile, the error determining S30 may finally include determining that the error occurs in the catalytic converter 50 when satisfying two conditions. The first condition in the fuel injection state, where a value less than the preset first time reference value is obtained from the difference between a time when the air-fuel ratio measured before the inlet of the catalytic converter 50 reaches the rich reference value and a time when the air-fuel ratio measured behind the outlet of the catalytic converter 50 reaches the rich reference value. The second condition in the fuel injection cut-off state, where a value less than the preset second time reference value is obtained from the difference between a time when the air-fuel ratio measured before the inlet of the catalytic converter 50 reaches the lean reference value and a time when the air-fuel ratio measured behind the outlet of the catalytic converter 50 reaches the lean reference value.

As described above, in the present disclosure, whether the error occurs in the catalytic converter 50 may be determined in consideration of both the fuel injection state and fuel injection cut-off state. As the fuel injection state may depend on a depression of the accelerator pedal 41, a condition suitable for each different state is applied to more accurately determine whether the error occurs in the catalytic converter 50. Accordingly, it may be possible to minimize a possibility of incorrectly detecting that the error occurs in the catalytic converter 50.

In the system and method for determining the error in the vehicle catalytic converter having a structure described above, an incorrect determination may be prevented and reliability of the determination may be improved, when determining whether the error occurs in the catalytic converter by determining whether the error occurs in the catalytic converter in consideration of both the fuel injection state and fuel injection cut-off state.

Although the present disclosure is shown and described with respect to specific exemplary embodiments, it is apparent to those having ordinary skill in the art that the present disclosure may be variously modified and altered without departing from the spirit and scope of the present disclosure as defined by the following claims

What is claimed is:

1. A system for determining an error of an oxidation-reduction reaction in a vehicle catalytic converter, comprising:
    a first oxygen sensor disposed in front of an inlet of a catalytic converter and configured to detect information regarding a concentration of oxygen in exhaust gas;
    a second oxygen sensor disposed behind an outlet of the catalytic converter and configured to detect the information regarding the concentration of oxygen in exhaust gas; and
    a controller having a processor and a module and configured to determine air-fuel ratios based on the concentration of oxygen in exhaust gas from the first and second oxygen sensors and a time when each of the air-fuel ratios reaches a lean reference value or a rich reference value to determine the error in the catalytic converter,
    wherein in a fuel injection state determined by a depressed amount of an accelerator pedal, the controller is configured to determine that the error occurs in the catalytic converter when a value being less than a preset first time reference value is obtained from a difference between the time when the air-fuel ratio, which is calculated based on the information of the first oxygen sensor, reaches the rich reference value and the time when the air-fuel ratio, which is calculated based on the information of the second oxygen sensor, reaches the rich reference value, using the processor and the module; and
    wherein in a fuel injection cut-off state determined by releasing a pressing force from the accelerator pedal, the controller is configured to suspend a determination of the error occurring in the catalytic converter when a value being greater than a preset second time reference value is obtained in advance from a difference between the time when the air-fuel ratio based on the information of the first oxygen sensor reaches the lean reference value and the time when the air-fuel ratio based on the information of the second oxygen sensor reaches the lean reference value, using the processor and the module.

2. The system of claim 1, wherein the controller is configured to determine that the error occurs in the catalytic converter when satisfying two conditions, using the processor and the module including:
    a first condition in the fuel injection state, where a value less than the preset first time reference value is obtained from the difference between the time when the air-fuel ratio calculated based on the information of the first oxygen sensor reaches the rich reference value and the time when the air-fuel ratio calculated based on the information of the second oxygen sensor reaches the rich reference value; and
    a second condition in the fuel injection cut-off state, where a value less than the preset second time reference value is obtained from a difference between the time when the air-fuel ratio calculated based on the information of the first oxygen sensor reaches the lean reference value and the time when the air-fuel ratio calculated based on the information of the second oxygen sensor reaches the lean reference value.

3. The system of claim 1, further comprising:
    a fuel regulator configured to adjust a fuel injection amount based on the depressed amount of the accelerator pedal,
    wherein the controller is configured to receive information regarding the fuel injection state based on the depressed amount of the accelerator pedal.

4. The system of claim 1, wherein the controller is configured to control a warning lamp to transmit a warning message in response to determining that the error occurs in the catalytic converter.

5. A method for determining an error of an oxidation-reduction reaction in a vehicle catalytic converter, comprising:
    determining, by a controller including a processor and a module, the air-fuel ratio measured in front of an inlet of a catalytic converter and the air-fuel ratio measured behind an outlet of the catalytic converter;
    determining, by the controller, whether the catalytic converter is in a fuel injection state determined by a depressed amount of an accelerator pedal or in a fuel injection cut-off state determined by releasing a pressing force from the accelerator pedal; and determining, by the controller, that the error occurs in the catalytic converter in the fuel injection state, when a value being less than a preset first time reference value is obtained from a difference between a time when the air-fuel ratio measured in front of the inlet of the catalytic converter reaches a rich reference value and a time when the air-fuel ratio measured behind the outlet of the catalytic converter reaches the rich reference value, using the processor and the module; and determining, by the controller, to suspend a determination of the error occurring in the catalytic converter in the fuel injection cut off state, when a value being greater than a preset second time reference value is obtained in advance from a difference between the time when the air-fuel ratio measured in front of the inlet of the catalytic converter reaches a lean reference value and the time when the air-fuel ratio measured behind the outlet of the catalytic converter reaches the lean reference value, using the processor and the module.

6. The method of claim 5, further comprising:

determining, by the controller, that the error occurs in the catalytic converter when satisfying two conditions, using the processor and the module including:

a first condition in the fuel injection state, where a value less than the preset first time reference value is obtained from the difference between the time when the air-fuel ratio measured in front of the inlet of the catalytic converter reaches the rich reference value and the time when the air-fuel ratio measured behind the outlet of the catalytic converter reaches the rich reference value; and a second condition in the fuel injection cut-off state, where a value less than the preset second time reference value is obtained from the difference between the time when the air-fuel ratio measured in front of the inlet of the catalytic converter reaches the lean reference value and the time when the air-fuel ratio measured behind the outlet of the catalytic converter reaches the lean reference value.

* * * * *